US012121952B2

(12) United States Patent
Staudinger et al.

(10) Patent No.: US 12,121,952 B2
(45) Date of Patent: Oct. 22, 2024

(54) PUNCHING/PERFORATING MACHINE

(71) Applicant: WISTA Werkzeugfertigungs-GmbH, Bad Rappenau (DE)

(72) Inventors: Gerd Staudinger, Eppingen (DE); Alexander Fuchs, Sinsheim (DE)

(73) Assignee: WISTA Werkzeugfertigungs-GmbH, Bad Rappenau (DE)

( * ) Notice: Subject to any disclaimer, the term of this patent is extended or adjusted under 35 U.S.C. 154(b) by 86 days.

(21) Appl. No.: 17/425,996

(22) PCT Filed: Jan. 31, 2020

(86) PCT No.: PCT/DE2020/000011
§ 371 (c)(1),
(2) Date: Jul. 27, 2021

(87) PCT Pub. No.: WO2020/156606
PCT Pub. Date: Aug. 6, 2020

(65) Prior Publication Data
US 2024/0009726 A1 Jan. 11, 2024

(30) Foreign Application Priority Data
Feb. 1, 2019 (DE) ..................... 20 2019 000 468.8

(51) Int. Cl.
*B21D 28/34* (2006.01)
*B26D 5/00* (2006.01)
(Continued)

(52) U.S. Cl.
CPC ............... *B21D 28/34* (2013.01); *B26D 5/00* (2013.01); *B26F 1/04* (2013.01); *B26F 1/24* (2013.01)

(58) Field of Classification Search
CPC . B26D 5/00; B26D 5/005; B26D 5/02; B26D 5/04; B26D 5/08; B26D 5/12; B26F 1/02; B26F 1/04; B26F 1/24
See application file for complete search history.

(56) References Cited

U.S. PATENT DOCUMENTS 4,481,533 A * 11/1984 Alzmann ............. H05K 3/0008 700/192
4,489,578 A * 12/1984 Nagai ..................... F16P 3/144 72/21.1
(Continued)

FOREIGN PATENT DOCUMENTS

DE 3339503 A1 5/1985
DE 4135787 A1 5/1992
(Continued)

*Primary Examiner* — Jason Daniel Prone
*Assistant Examiner* — Richard D Crosby, Jr.
(74) *Attorney, Agent, or Firm* — Smartpat PLC

(57) ABSTRACT

A punching/perforating machine (10) for generating a punching/perforating pattern in a supplied material unit/web (M), comprising a punching tool (12) having a plurality of punches/perforating needles (16) which are arranged in a predetermined grid in a longitudinal direction (L) and which are movable via a pressure beam (36) which is operatively connected via a control device (30) to a drive unit (18) for generating a punching/perforating stroke (H) transversely to the longitudinal direction (L), and comprising a control block (14) for actuating/activating/deactivating the punches/perforating needles (16) by the control device (30) during the punching/perforating process, characterized in that the punching tool (12) and/or the control block (14) is/are each designed as a separate subassembly which is/are each arranged within the punching/perforating machine (10) so as to be removably fastenable separately as a unit.

17 Claims, 6 Drawing Sheets

(51) Int. Cl.
*B26F 1/04* (2006.01)
*B26F 1/24* (2006.01)

(56) References Cited

U.S. PATENT DOCUMENTS

| | | | | | |
|---|---|---|---|---|---|
| 4,947,719 | A * | 8/1990 | Whistler | B26F 1/14 | 83/955 |
| 5,136,521 | A * | 8/1992 | van Daalen | B21D 28/346 | 700/160 |
| 5,144,872 | A | 9/1992 | Kakimoto | | |
| 5,325,755 | A * | 7/1994 | Morita | B21D 37/04 | 83/639.1 |
| 5,357,446 | A | 10/1994 | Maeda et al. | | |
| 6,006,636 | A * | 12/1999 | Baldwin | B26F 1/04 | 83/13 |
| 6,062,120 | A * | 5/2000 | Tsuzaki | B26D 9/00 | 83/687 |
| 6,408,726 | B1 * | 6/2002 | Taijonlahti | B23Q 16/001 | 83/563 |
| 6,481,323 | B1 * | 11/2002 | Beerhalter | B26F 1/04 | 83/563 |
| 7,086,582 | B2 * | 8/2006 | Yang | B26F 1/04 | 83/563 |
| 7,806,031 | B1 * | 10/2010 | Rytz | B21D 28/16 | 83/639.1 |
| 8,087,333 | B2 * | 1/2012 | Oishi | B21D 28/26 | 83/140 |
| 11,787,076 | B2 * | 10/2023 | Staudinger | B26F 1/24 | 83/76.1 |
| 2003/0177878 | A1 * | 9/2003 | Yang | B21D 28/246 | 83/13 |
| 2003/0226486 | A1 * | 12/2003 | Filges | D05B 37/04 | 112/65 |

FOREIGN PATENT DOCUMENTS

| | | | |
|---|---|---|---|
| DE | 202005010990 | U1 | 9/2005 |
| DE | 202014104997 | U1 | 12/2014 |
| DE | 202017103498 | U1 | 7/2017 |
| EP | 0508557 | A2 | 10/1992 |
| EP | 0963801 | B1 | 2/2004 |
| JP | H08323695 | A | 12/1996 |

* cited by examiner

PUNCHING/PERFORATING MACHINE

TECHNICAL FIELD

The present disclosure relates to a punching/perforating machine for generating a punching/perforating pattern in a supplied material unit/web.

BACKGROUND

DE 33 39 503 A1 discloses a punching machine having a plurality of punches, each interacting with a female die, a drive device for the punch movements and a feed device for moving the material to be punched cyclically onward through the punching machine. In at least one of the punches, preferably in all of the punches, an individual drive that can be switched on and off and/or a coupling to the drive device that can be switched on and off is provided. The punching machine also has a machine table having a plurality of receiving positions for a respective tool unit. The tool unit has at least one female die and at least one punch that can be acted on by the drive device. The tool unit comprising the female die and a punch interacting with the female die has an individual drive that can be switched on and off or a coupling device that can be switched on and off for the transmission of the punch drive force.

DE 41 35 787 A1 describes a punch processing device for producing a punching pattern, comprising an upper die with a punch holder having a plurality of punches and comprising a stripping plate located underneath with holes for receiving the ends of the punches projecting from the punch holder, in such a way that they can be extended or retracted, and a lower die with holes into which the ends of the punches enter during the punching process. Feed devices move a material unit introduced between the lower die and the stripping plate intermittently and synchronously with the punching process. The punches are held in the punch holder such that they can be moved upward and downward, wherein the upper sides of heads of the punches end smoothly or with the upper surface of the punch holder. Press heads with a head surface are used for pressing down the punch heads. In addition, a stepped section preventing pressing down is movable by press head drive devices in such a way that either the head surface or the stepped section is aligned with the respective punch head. The press head drive devices are controlled by a control circuit, which generates binary-coded processing data according to the punching pattern.

German Utility Model DE 20 2005 010 990 U1 describes a device for punching workpieces, comprising an upper tool and a lower tool, wherein the upper tool is movable relative to the lower tool, wherein a plurality of punches and actuating elements assigned thereto are arranged in the upper tool, which can be adjusted between an actuating position, in which the punches process the workpiece during a movement of the upper tool relative to the lower tool, and a non-actuating position, in which the punches do not process the workpiece during a movement of the upper tool relative to the lower tool, and wherein the upper tool has a first, upper punch guide plate with holes for the punches to be led through and a second punch guide plate, facing the lower tool, with holes for the punches to be led through. Furthermore, a second punch guide plate, facing the lower tool, of the upper tool is part of a hold-down element, wherein the friction of the punches within the holes in the hold-down element is higher than within the holes in the upper punch guide plates of the upper tool.

German Utility Model DE 20 2017 103 498 U1 discloses a perforating machine comprising a machine table and a striking unit movable relative thereto, comprising a perforating tool which is accommodated either on the machine table or on the striking element and which is assigned a female die on the respective other part, is guided such that it can be driven in its longitudinal direction to perforate a material web between the perforating tool and female die. Additionally provided are means for the simultaneous movement of the perforating tool and the female die in the transverse direction relative to the material web.

German Utility Model DE 20 2014 104 997 U1 describes a punch having a plurality of punches, the punch heads of which are supported in a punch receiving plate. The mounting of the punch heads in the punch receiving plate is configured in such a way that an undercut results during the reverse stroke of the punches, wherein a drive element moves the punch receiving plate indirectly. The punch has at least one locking element, which is assigned to at least one punch and is located between the drive element and the punch receiving plate. The locking element is movable into two operating positions, wherein the locking element fills up the interspace between the drive element and the punch head of the at least one punch in a first operating position and, in a second operating position, the locking element forms a clearance above the punch head of the at least one punch and wherein, in addition, the at least one punch is held by a braking element, at least in the second operating position of the locking element.

In the known punching/perforating machines, punching tool and control block are screwed to each other via a multiplicity of screw connections and, additionally, also fixed to the machine frame of the machine. This means that in the event of maintenance, which arises regularly because of the continuous use of the punching/perforating machines, for example grinding of the perforating needles and/or female dies, or in the event of a repair, it can be carried out only with time-consuming and complicated measures. This means that during maintenance work or repair work, the punching/perforating machine cannot take part in the production process for a relatively long time period.

Furthermore, in the known punching/perforating machines, the distance between the punches/perforating needles is relatively large because of the chosen geometry, meaning that punching/perforating patterns with a small grid size cannot be produced.

The number of needles in the known punching/perforating machines is therefore highly limited per unit area.

Furthermore, with respect to the known punching/perforating machines, it should be noted that the cycle rate with respect to the punching/perforating strokes to be carried out is relatively low because of the mechanically chosen designs, which increases the processing time in the production process. This has a detrimental effect on the economical use of such punching/perforating machines.

SUMMARY

The present disclosure provides improved punching/perforating machines which considerably reduces the times for maintenance or repair and, as a result, permits economical use of such a punching/perforating machines.

A punching/perforating machine for generating a punching/perforating pattern in a supplied material unit/web, comprises a punching tool having a plurality of punches/perforating needles which are arranged in a predetermined grid in a longitudinal direction and which are movable via a pressure beam which is operatively connected via a control device to a drive unit for generating a punching/perforating stroke transversely to the longitudinal direction. A control block is provided for actuating/activating/deactivating the punches/perforating needles by the control device during the punching/perforating process.

The punching tool and/or the control block is/are each designed as a separate subassembly, which is/are each arranged within the punching/perforating machine so as to be removably fixable separately as a unit.

A particularly preferred refinement is distinguished by the fact that the punching tool and/or the control block are arranged such that they can be pulled in/out in the longitudinal direction in guide grooves present within the punching machine.

A particularly advantageous development of the punching/perforating machine is distinguished by the fact that the guide grooves are formed in such a way that additional adapter units can be introduced in order to permit the form-fitting mounting of different geometries of punching tools or control blocks.

As a result of the structure according to the disclosure relating to the punching tool and the control block comprising individual subassemblies that can be assembled independently of one another, overall a system is available which is very flexible and in the event of maintenance—for example for grinding the perforating needles or female dies—or during a repair, results in only individual subassemblies or parts thereof having to be replaced or removed in order to carry out the maintenance/repair measures. The punching tool and the control block can be separated from each other independently, as opposed to the known systems, in which the punching tool and the control block are screwed completely to each other in a multiple connection and, in addition, are also screwed to the machine frame.

The use of guide grooves and the omission of screwed fixings within the system means that rapid punching tool and control block changing is possible. In this way, it is possible to achieve a reduction in the changeover times for the aforementioned two parts by up to 80% as compared with the known systems. This means that, during the regularly occurring maintenance and/or repair work, as compared with the known punching/perforating machines, substantially lower stoppage times during the performance of the maintenance and/or repair work are possible, which means that the economical use of such punching/perforating machines is considerably increased.

The present disclosure is further based on the object and the technical problem of specifying a punching/perforating machine which permits the creation of a variably predefinable punching pattern which, as compared with the known machines, ensures a substantially higher cycle rate of the perforation stroke, permits a number of punches/perforating needles per unit area which is increased as compared with the known machines, and ensures permanently reliable functionality.

The punching/perforating machine is accordingly characterized by the following features:

- a memory device, in which the data for the geometry of the punching/perforating pattern is stored,
- a control device, which has a communication link with the memory device,
- a control block which has piston cylinder units, the movements of which can be controlled individually via the control device during the punching/perforating stroke and are individually assigned to each punch/each perforating needle,

- a blocking slide, which is respectively connected to a corresponding piston rod of the piston-cylinder unit, wherein the blocking slide can be displaced into an activation or deactivation position by the movement of the piston rod,
- in the activation position, the blocking slide acts directly or indirectly on the punch/the perforating needles during the execution of the stroke,
- in the deactivation position, the blocking slide does not exert any action on the punch/the perforating needles,
- such that, in the activation position of the blocking slide, the latter acts on the punch/perforating needle during the stroke movement and a perforation is performed and, in the deactivation position of the blocking slide, no punching/perforation of the material unit/web is effected.

A particularly preferred refinement, which permits the implementation of high cycle rates, is distinguished by the fact that the piston-cylinder unit is formed as a double-acting piston-cylinder unit having a first pressure chamber and a second pressure chamber, wherein a first pressure is applied permanently to the first pressure chamber via the control device and has the effect that the blocking slide is located or is held in the deactivation position and, when carrying out punching or perforation, the control device applies a second pressure, which is higher than the first pressure, to the second pressure chamber, when activated, so that the blocking slide moves out into the activation position and, as a result, during the stroke movement, this movement is transmitted to the associated punch/perforating needles, so that punching or perforation of the material unit/web is carried out.

A particularly advantageous development, which ensures permanently functional use at high cycle rates, is distinguished by the fact that the blocking slide is in each case connected to the corresponding piston rod of the piston-cylinder unit in a form-fitting manner with axial and radial play.

A particularly preferred refinement of the punching/perforating machine is distinguished by the fact that the control block has guide recesses arranged in a grid which can be predefined in the longitudinal direction and which corresponds to the grid of the punch/the perforating needles, in which guide recesses there are extension profiles longitudinally displaceably mounted in the stroke direction, the length of which corresponds to the distance between the underside of the respective blocking slide and the head of the associated punch or perforating needles. These extension profiles ensure that as the punching/perforating stroke is carried out and when the blocking slide is activated, the associated punches/perforating needles are reliably activated. The lengths of the extension profiles are each adapted individually to the position of the associated punch or perforating needle.

A particularly preferred refinement, which ensures a compact structure of the control block in conjunction with a small grid size of the punches/perforating needles to be activated, is distinguished by the fact that the control block has housings which can be controlled individually by the control device and which have a plurality of individually controllable piston-cylinder units that are offset in the longitudinal direction and in the stroke direction.

In order to produce the desired punching/perforation patterns on the material unit or web—specifically with the respectively desired geometry of the spacing of the perforations from one another—a particularly advantageous refinement of the punching/perforating machine is distinguished by the fact that the piston-cylinder units arranged within the housing correspond in the longitudinal direction to an offset dimension of 0.5 times, 1 times and 2 times or multiples of the grid size of the arrangement of the punches/the perforating needles within the punching tool.

An advantageous development which, firstly, facilitates the disassembly of the punching tool and, secondly, permits the use of other tools with the same tool profile—but with a different grid of the punches/perforating needles—for example when the drive of the perforating process is switched off, is distinguished by the fact that a spacer plate is arranged above on a needle holder of the punching tool, which either has congruent recesses corresponding to the grid size of the punch/the perforating needle in the same grid size or is formed as a closed metal sheet.

A particularly preferred constructional design variant, which permits efficient and economical use, is distinguished by the fact that there is a valve device, which is activated by the control device and has a communication link with the piston-cylinder units of the control block.

A further advantageous design variant, which ensures permanently reliable functionality with regard to permanently ensuring high cycle rates, is distinguished by the fact that the blocking slide has in its free end region a contour inclined relative to the stroke direction in such a way that when the blocking slide is extended, a possibly projecting extension profile or projecting punch/perforating needle is pushed downward in the stroke direction.

A particularly preferred and advantageous refinement of the punching/perforating machine, which substantially improves the handling for the operator for operating the machine and, at the same time, ensures high functionality, is distinguished by the fact that there is a projection laser unit which, depending on the data stored in the memory device relating to the contour of the material to be processed or perforated, depicts these contours on a support table of the machine, whereby exact alignment of the material is made possible and the position data then acquired by the projection laser is fed to the control device.

A constructionally particularly advantageous refinement which further increases the functionality is distinguished by the fact that the longitudinally displaceable extension profile has a step-like external circumferential contour, and the associated guide recess has a corresponding mating contour.

A refinement which is particularly advantageous with regard to the variability and functionality is distinguished by the fact that the housing having a plurality of piston-cylinder units is designed to be autonomous with regard to control, pressure regulation and pressure monitoring or the like.

In an alternative, advantageous refinement, the valve device, which is remotely controlled by the control device, is configured as a separately formed unit that can be connected to the punching/perforating machine.

A particularly preferred constructional refinement which has particularly proven itself in practice with regard to the required punching/perforation pattern to be produced, is distinguished by the fact that the housing has four piston-cylinder units and the control block/the punching tool has four grid recesses arranged to be offset in the form of a grid in the longitudinal direction and in the transverse direction for the extension profile or the punch/the perforating needles.

A constructionally particularly simple solution which is advantageous with respect to maintenance/repair and when changing the punching tool, is distinguished by the fact that the spacer plate is fixed to the upper side of the needle holder.

According to a particularly advantageous refinement, the valve device can be formed as a pneumatic or hydraulic system.

The present disclosure thus comprises an accessory unit, specifically a punching unit for installation in a punching/perforating machine in a special design, wherein the machine can be equipped with various tool adapters in order to accommodate different tool profiles found on the market. This is made possible by the provision of corresponding guide profiles for the control block and the punching tool. Apart from the punching/perforation of round holes, any desired symmetrical and/or asymmetrical contours (shapes) can therefore be produced within predefined dimensional and technical limits.

The punching/perforating machine has, in detail, the following subassemblies: a control device which has a control block with appropriate guide, a valve device with specific piston-cylinder units with associated piston rods, which can be activated individually via the control device, and blocking slides, which are assigned to each punch/each perforating needle, with corresponding mechanical extension profiles which are arranged between blocking slide and the punch/perforating needles.

The punching/perforating machine is driven by means of a servo-hydraulic system or alternatively by a motor with a pneumatic brake-clutch combination. The control block is arranged under the pressure beam, being connected to the latter by a T-groove guide and centering pins. The pressure beam is moved up and down in the stroke direction by the aforementioned drive, depending on the signals from the control device. Located under the control block is a corresponding punching tool, the grid of which is identical to that of the control block. A needle holder of the punching tool is likewise guided on the control block by means of a T-groove guide, and the lower part of the punching tool having the female dies is positioned by means of centering pin. This lower part, too, is placed in a T-groove guide. The needle holder, together with the needle guide which is firmly connected to the tool, forms a unit, the so-called punching tool.

In order to construct the control block, the following has to be carried out:

In detail, the control block comprises, for example, pneumatically controlled piston-cylinder units that are supported on the reverse stroke by a so-called air spring. A piston rod/a cylinder piston is used for each perforating needle that is to be activated in the tool.

In a particularly preferred refinement, a piston-cylinder housing unit is used, which is formed from four piston-cylinder units that operate independently of one another and have piston rods. The result is a narrow structure.

On the head of each piston rod, the connection to a blocking slide is produced with the aid of a form-fitting but loose connection. This connection permits play both in the axial and in the radial direction, which ensures permanently reliable functionality, since system-induced geometric inaccuracies are sublimated.

As a result of the mutually separated structure of control block and punching tool, it is possible to achieve the minimum spacing between the punches/perforating needles in the tool, which corresponds to a standard perforation, for example in automobile construction. The result is, for example, currently a maximum number of needles of 1024 needles on a perforation width of 1945.6 mm.

Such a number of needles cannot be achieved in the known punching/perforating machines.

A mechanical extension (extension profile) is used to bridge the distance between the head of the individual needle and its associated blocking slides. Said extension consists, for example, of a hardened round material of stepped diameter, which rests loosely on the head of the needle. As a result of the stepped external diameter, the vertically installed extension profile in the control block is prevented from falling out when the tool is installed or removed. At the same time, this extension profile is kept in a fixedly defined position above the needle head by the aforementioned shoulder. In order to compensate for the difference between the predefined needle diameter or needle spacing and the necessarily wider blocking slide with the associated piston rod, the mechanical extension profiles are inserted with different lengths in the control block and assigned appropriately to the blocking slides.

The individual special cylinders or the piston-cylinder units used in the control block are controlled by a valve device which, within the machine in four housing units are protected against damage or access and integrated. These housings contain the complete electronic and pneumatic control (valve terminals, pressure regulation, pressure monitoring, etc.). These units are connected to the valves on the control block by means of a coupling system (multi-pole). Alternatively, however, the valve devices can also be mounted flexibly on corresponding transport frames, in order to use the same on different stamping/perforating machines. As a result, there is no restriction to only one working area.

The functioning of the punching/perforating proceeds as follows:

The geometric data of the perforation pattern is defined and acquired electronically. This data is transmitted to the storage device of the punching/perforating machine and evaluated by the control device.

Alternatively or in parallel therewith, the data, for example of a predefined arbitrary contour (external or internal shape) of the material to be perforated, can be depicted on a feed table by means of a projection laser. By using this depiction, the material can be aligned and this position data can be transmitted to the control device. By means of control signals determined by the control device, the piston rods of the piston-cylinder units in the control block are controlled via the valve devices.

Because of the application of pressure to the respectively individually associated piston-cylinder unit, activated in the individual case, the respective piston rod of the piston-cylinder unit extends and moves the blocking slide forward into the activation position. In this position, the mechanical extension (extension profile) is delimited at the top by the lower edge of the blocking slide. This results in the punch/the perforating needle being held by the extension profile during the punching cycle which then follows, and thus punching takes place.

If the piston rod is not activated during the following punching cycle, then the backing pressure that is always present from the pressure accumulator unit (so-called air spring) that acts on the piston-cylinder unit has the effect that the piston rod moves back automatically to its initial position, i.e. the deactivation position. Therefore, the blocking slide is also drawn back and releases the limit at the upper end of the extension profile. During the punching cycle which then follows, the punches or the perforating needles and the extension profile above them are pushed back onto the upper edge of the blocking slide when they encounter the material to be perforated. Therefore, no punching takes place. Since the guidance of the punches/perforating needle and the associated extension profile are very smooth-running because of the system, the surface of the material to be perforated is not damaged.

Owing to the fact that each piston-cylinder unit is formed as a double-acting piston cylinder unit and, as a result of the permanently applied backing pressure of the associated pressure accumulator, a return stroke into the deactivation position of the blocking slide is always effected, the latter being moved into the activation position via the valve device only upon activation by an increased backing pressure, the switching time between the individual punching operations can be reduced significantly. This results in a substantially higher cycle rate of the punching unit, for example 160 to 180 punching operations per minute, as compared with known punching/perforating machines.

Further embodiments and advantages of the invention can be gathered from the features further listed in the claims and from the exemplary embodiments given below. The features of the claims can be combined with one another in any desired way, insofar as they are not obviously mutually exclusive.

The invention and advantageous embodiments and developments thereof will be described and explained in more detail below with reference to the examples illustrated in the drawing. The features to be gathered from the description and from the drawing can be used individually on their own or in a plurality in any desired combination according to the invention.

DETAILED DESCRIPTION

Figure 1:
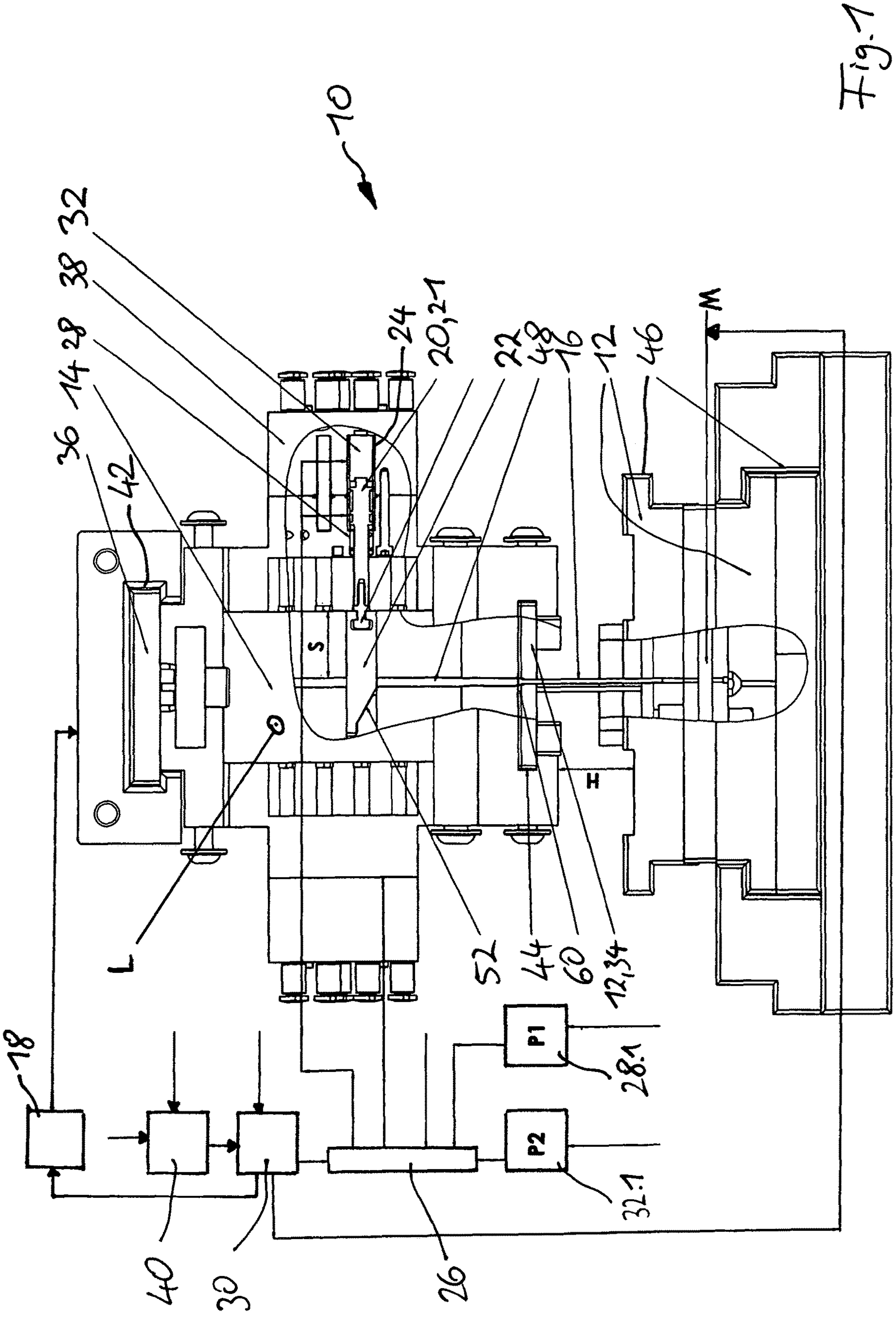
FIG. 1 shows a highly schematic illustration of a punching/perforating machine having a control block arranged in guide grooves and a punching tool arranged in guide grooves, comprising punches/perforating needles that can be activated individually via a control device, valve device and piston-cylinder units with blocking slides.

The punching/perforating machine 10 illustrated schematically in FIG. 1 has a punching tool 12 and a control block 14. In the punching/perforating machine 10, driven by a servo-hydraulic unit, the control block 14 is connected to a pressure beam 36, i.e. it is inserted into a control block guide groove 42 on the pressure beam 36 and is centered. The pressure beam 36 is moved up and down in the stroke direction H by a drive unit 18. Located under the control block 14 is the corresponding punching tool 12, the grid of which for the perforating needles 16 is identical to that of the control block 14. The punching tool 18 has a needle holder 34, which is inserted into a needle holder guide groove 44 in the control block 14. The lower part of the punching tool 12 having the female dies is centered by means of a centering pin, not specifically illustrated. This lower part of the punching tool 12 is also placed in tool guide grooves 46. The needle holder 34, together with the needle guide, which is firmly connected to the punching tool 12, forms one unit, namely the punching tool 12.

Located on the needle holder 34 is a spacer plate 60 which, firstly, facilitates the disassembly of the punching tool 12 and, secondly, permits the use of further standard tools with the same tool profile but different pitch. Here, the open spacer plate 60, which is provided with grid holes (see FIGS. 1 to 4), is replaced by a closed variant without grid holes (see FIG. 5).

The perforating needles 16 are arranged in a predefined pattern in the longitudinal direction L, which extends at right angles to the plane of the illustration of FIG. 1. The perforating needles 16 can either be activated or deactivated individually during each perforation stroke H. This individual activation is implemented by there being a control device 30, which has a communication link with a memory device 40, in which the geometric data of the perforation pattern to be created on a material web M fed to the punching tool 12 is stored.

The control device 30 has a communication link with a valve device 26, wherein the valve device 26 has valve units which each individually have a communication link with piston-cylinder units arranged on the control block 14. The piston-cylinder units are formed as double-acting piston-cylinder units, comprising a cylinder 24, a piston 21 and a piston rod 20. In each piston-cylinder unit there is a first pressure chamber 28 and a second pressure chamber 32.

Each piston rod 20 is connected in its free end region to a blocking slide 22, which can be displaced in the sliding direction S transversely with respect to the stroke direction H from an activation position (extended state) and a deactivation position (retracted state) when appropriate pressure is applied to the piston-cylinder unit. Furthermore, there is a first pressure accumulator 28.1 and a second pressure accumulator 32.1, which communicate with the valve device 26. The first pressure chamber 28 provides a pressure P1, and the second pressure chamber 32 provides a pressure P2, which is higher than the pressure P1.

Each perforating needle 16 is assigned a blocking slide 22 with associated controllable piston-cylinder unit. The blocking slide 22 is at a distance from the upper head end of the perforating needle 16. Underneath the blocking slide 22 there is an extension profile 48 in the control block 14 in a corresponding guide, wherein the underside of the extension profile 48 rests on the head of the associated perforating needle 16, and the upper end face of the extension profile 48 is arranged at the vertical level of the underside of the blocking slide 22. In the extended state of the blocking slide 22, the latter rests on the extension profile 48 in such a way that when the stroke movement H of the control block 14 is carried out, the perforating needle 16 is moved downward and triggers a perforation on the material web M.

When the blocking slide 22 is retracted, there is no contact between extension profile 48 and blocking slide 22, since the underside of the blocking slide 22 is beside the underside of the extension profile 48. If a perforation stroke is carried out in the retracted position of the blocking slide 22, the extension profile 48 has no movement applied to it by the blocking slide 22, such that the associated perforating needle 16 does not perform a perforation.

In its free end region, the blocking slide 22 has a contour 52 extending at an angle to the stroke direction H, which ensures that if the extension profile 48 and the perforating needle 16 protrude upward when the blocking slide 22 is extended, the extension profile 48 is pushed downward and is not sheared off or damaged. As a result, permanently reliable functionality is ensured.

During the operation of the punching/perforating machine, the first pressure chamber 28 and the second pressure chamber 32 are controlled individually as follows via the valve device 26 and the control device 30, taking into account the stored perforation pattern data. The first pressure chamber 28 has the pressure P1 applied permanently via the first pressure accumulator 28.1, i.e., under the action of the pressure P1, the blocking slide 22 is located in the retracted position such that, when the perforation stroke H is carried out, the associated perforating needle 16 does not perform any perforation.

If a perforating needle 16 is to be activated during a perforation stroke H, the control device 30 causes the valve device 26 to apply the pressure P2 to the second pressure chamber 32 via the second pressure accumulator 32.1, said pressure P2 being higher than the permanently present pressure P1 in the first pressure chamber 28, such that the blocking slide 22 moves out and, when the perforation stroke H is carried out, the associated perforating needle 16, in conjunction with the extension profile 48, carries out a perforation stroke H and produces a perforation on the material web M.

On the control block 14 there are thus individually activated piston-cylinder units which are under a permanent first pressure P1 which, so to speak, forms an air spring on the return stroke, wherein for each perforating needle 16 to be activated in the punching tool 12, a piston rod 20 of the corresponding piston-cylinder unit is assigned and is activated, that is to say extended, by having the pressure P2 applied.

In practice, use is made of an embodiment not specifically illustrated in FIG. 1, wherein a housing 38 is used which has four piston-cylinder units operating independently of one another and having piston rods 20. These piston-cylinder units are arranged to be offset relative to one another in the stroke direction H and in the longitudinal direction L within the housing 38, the housings 38 being present on both sides of the control block 14. This results in a narrow structure. At the head of each piston rod 20, the connection to the blocking slide 22 is produced with the aid of a form-fitting but loose connection. This connection permits play both in the axial and in the vertical direction. As a result, possible damage to the extension profile 48 as the blocking side 22 is extended and retracted is counteracted and, overall, the functionality is improved.

As a result of the mutually separated structure of control block 14 and punching tool 12 in conjunction with the piston-cylinder units arranged offset in the stroke direction H and in the longitudinal direction L within a housing 38, it is possible to achieve a minimum spacing with respect to the grid size between the perforating needles 16 in the tool 12 which, for example, corresponds to a standard perforation in automobile construction. From this, for example a maximum number of 1024 needles with a perforation width of 1.9456 mm can be achieved.

This high number of needles per unit area cannot be achieved in the known systems.

As already described above, the extension profile 48 is arranged between the head of the individual perforating needles 16 and blocking slides 22. The extension profile 48 consists, for example, of a hardened round material with a stepped diameter, which rests loosely on the head of the perforating needle 16. The stepped external diameter prevents any movement of the vertically installed extension profile 48 in the control block 14 during installation or removal of the tool. At the same time, the extension profile 48 is held in a fixedly defined position above the needle head by this shoulder.

In order to compensate for the difference between the predefined needle diameter or needle spacing and the necessarily wider blocking slide 22 with the associated piston rod 20, these mechanical extension profiles 48 are inserted with different lengths in the control block 14 and assigned accordingly to the blocking slides 22.

The individual piston-cylinder units are present on both sides of the control block 14 as special cylinders and are controlled individually by control valves 26. These special cylinders are arranged within the machine, for example in housings 38 each having four piston-cylinder units, in order to protect them against damage or access. These housings 38 contain the complete electronic and pneumatic control (valve terminals, pressure regulators, pressure monitoring, etc.). These housings 38 are connected by means of a coupling system constructed for this purpose to the valve device 26 with its individually associated control valves. Alternatively, however, the control valves of the valve device 26 can also be mounted flexibly on appropriate transport frames, in order to use the same on different punching machines. As a result, there is no restriction to only one working area.

As a result of the permanently present backing pressure P1 in the reverse stroke of the piston rod 20 of the piston-cylinder units, the switching time between the punching operations can be reduced greatly. This results in a substantially higher cycle rate (for example 160 to 180 per minute) of the punching unit as compared with the known punching machines.

FIGS. 2 to 5 illustrate a constructional exemplary embodiment according to the punching tool from FIG. 1 in detail. The same components bear the same designations and will not be explained again.

Figure 2:
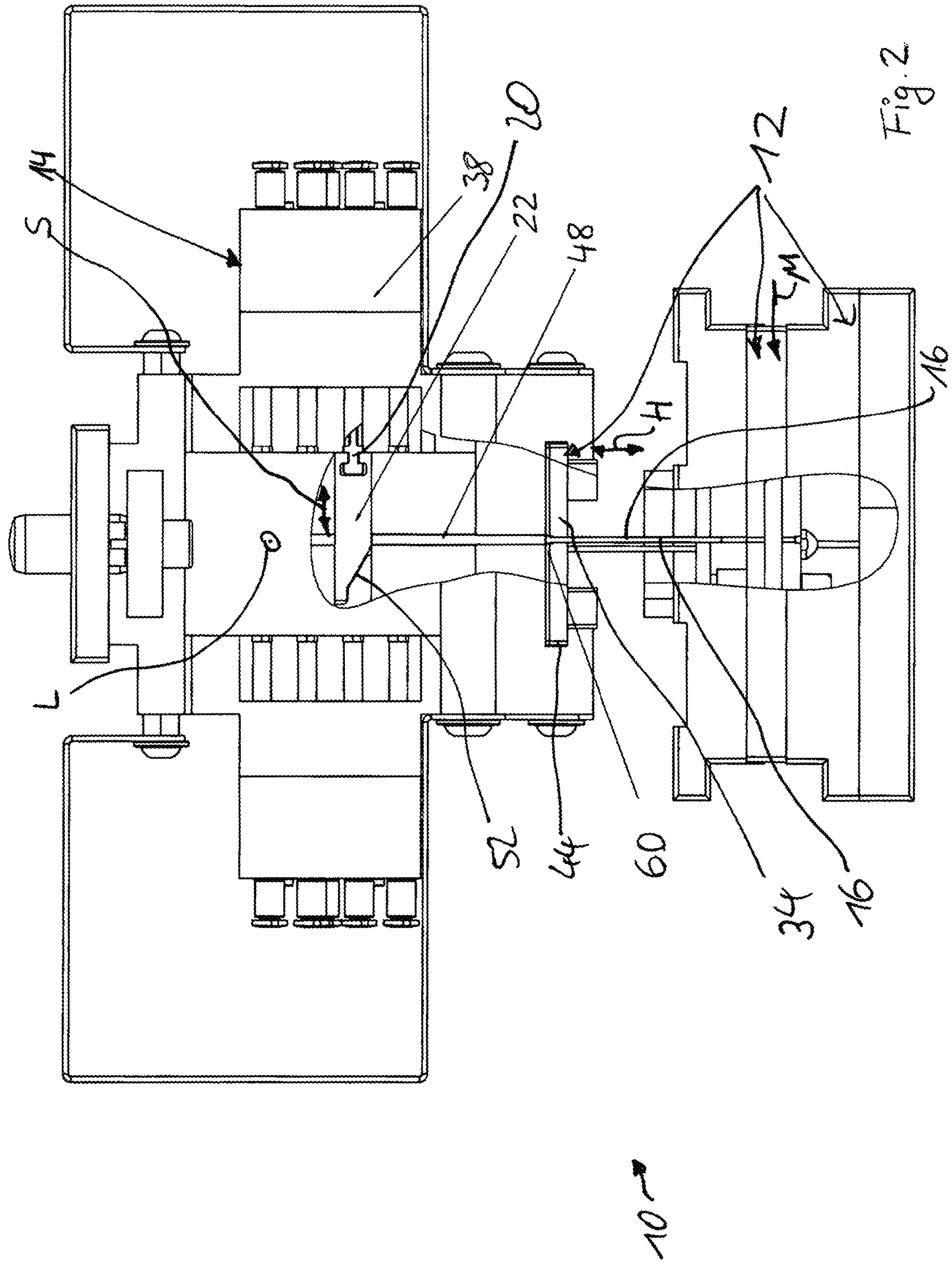
FIG. 2 shows a partial schematic detailed illustration of a constructional design variant of the punching/perforating machine according to FIG. 1 with an exemplary illustration of a blocking slide in the activation position before the perforation stroke, wherein a spacer plate with a hole pattern is arranged on the needle holder of the perforation needles.
Figure 3:
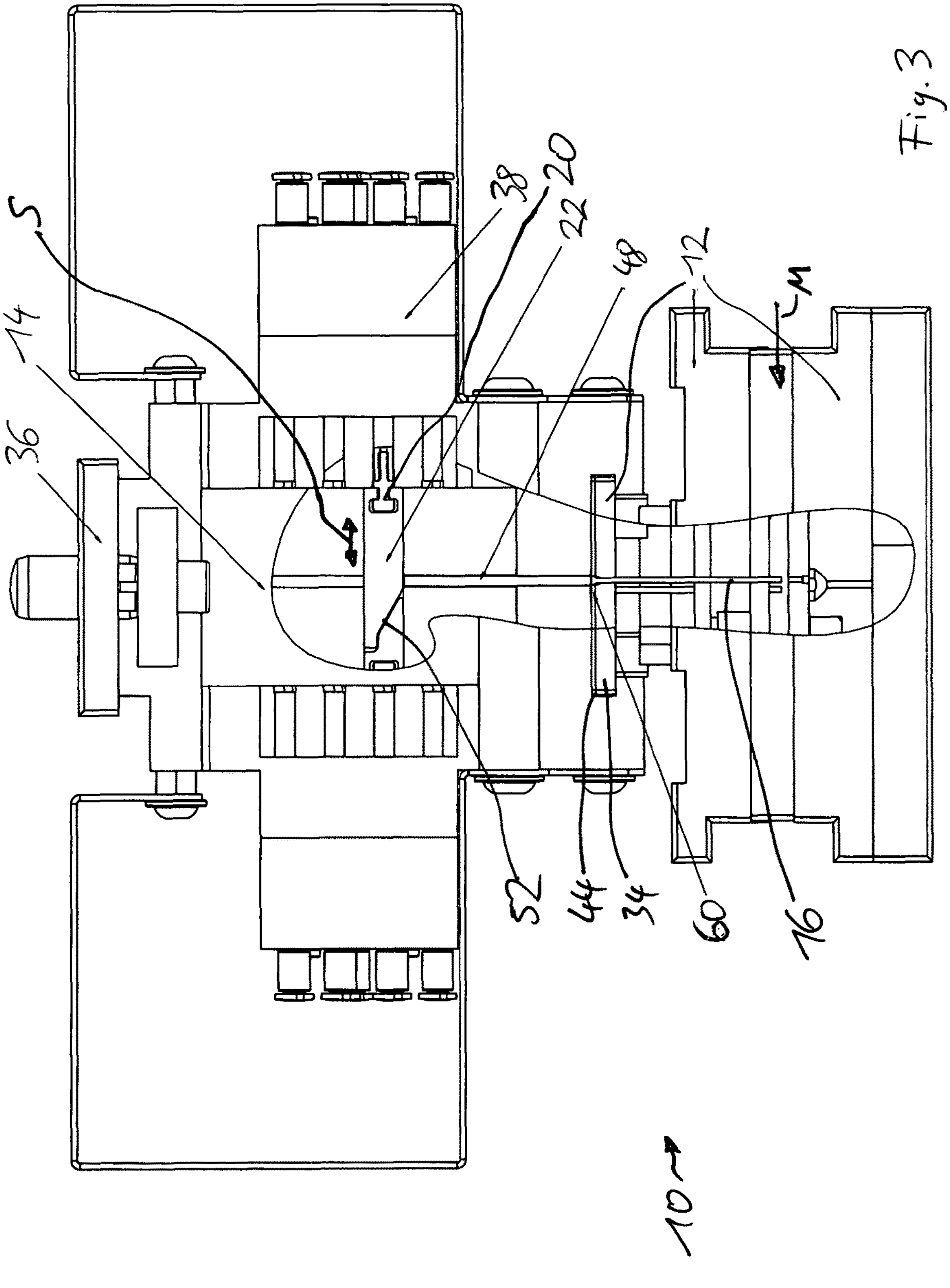
FIG. 3 shows a schematic detailed view of the punching/perforating machine according to FIG. 2 after the perforation stroke has been carried out.
Figure 4:
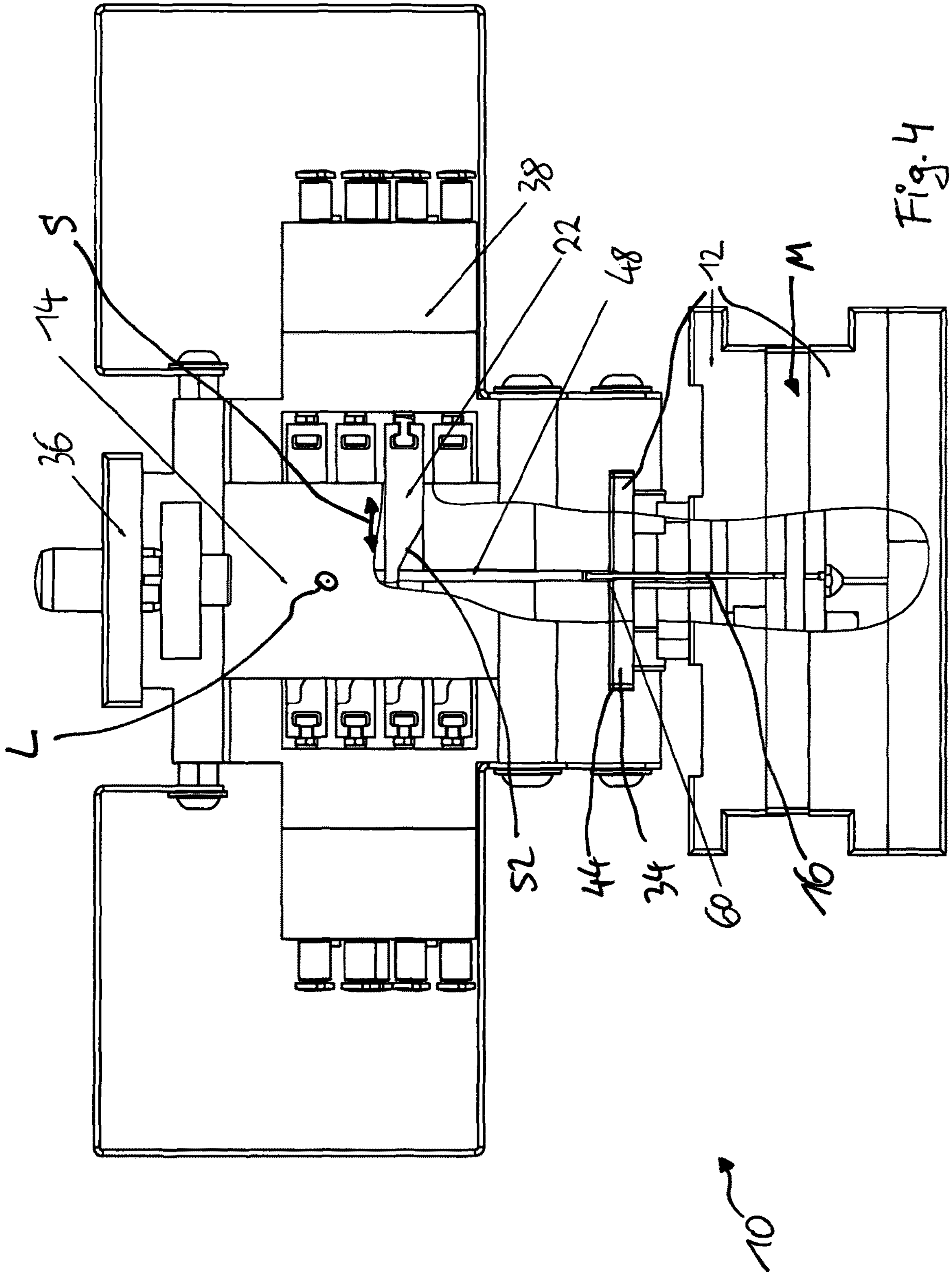
FIG. 4 shows a schematic detailed view of the punching/perforating machine according to FIG. 2 with the blocking slide retracted after the perforation stroke.
Figure 5:
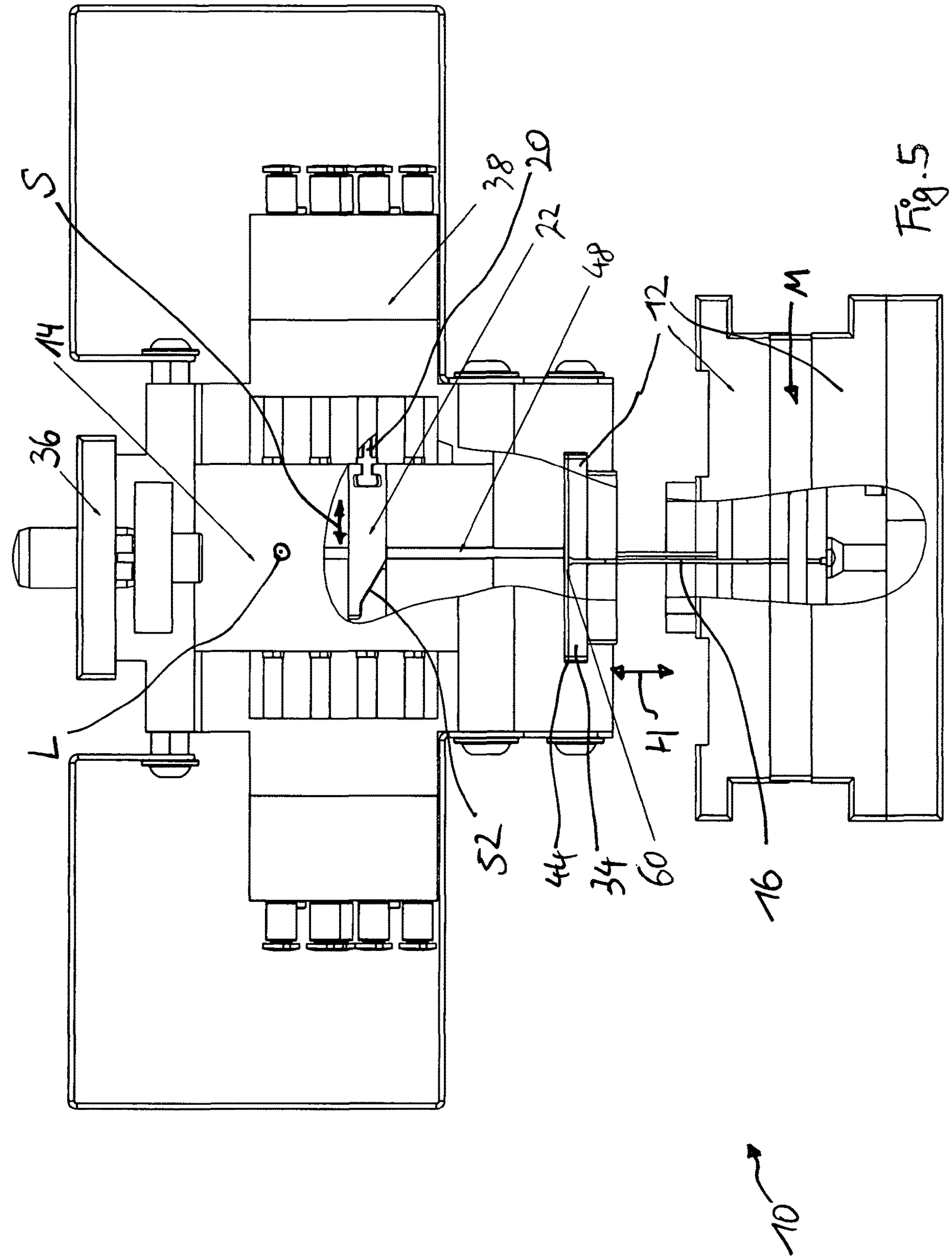
FIG. 5 shows a schematic detailed view of the punching/perforating machine according to FIG. 4 before the perforation stroke, wherein a closed spacer plate, i.e. without a hole pattern, is fixed to the needle holder.

FIG. 2 shows a situation in which the blocking slide 22 has been extended before the perforation stroke has been carried out. FIG. 3 shows the situation with the blocking slide 22 extended after the perforation stroke has been carried out. FIG. 4 shows a blocking slide 22 in the retracted position after the perforation stroke has been carried out, and FIG. 5 shows the situation with the blocking slide 22 extended, wherein a spacer plate 60 without drilled holes is used before the perforation stroke is carried out, i.e. during a perforation stroke, all the perforating needles 16 perform a perforation. In this case (see FIG. 5), the guide of the perforating needles 16 is arranged to be offset laterally relative to the guide when a spacer plate (60) with a hole pattern is used.

Figure 6:
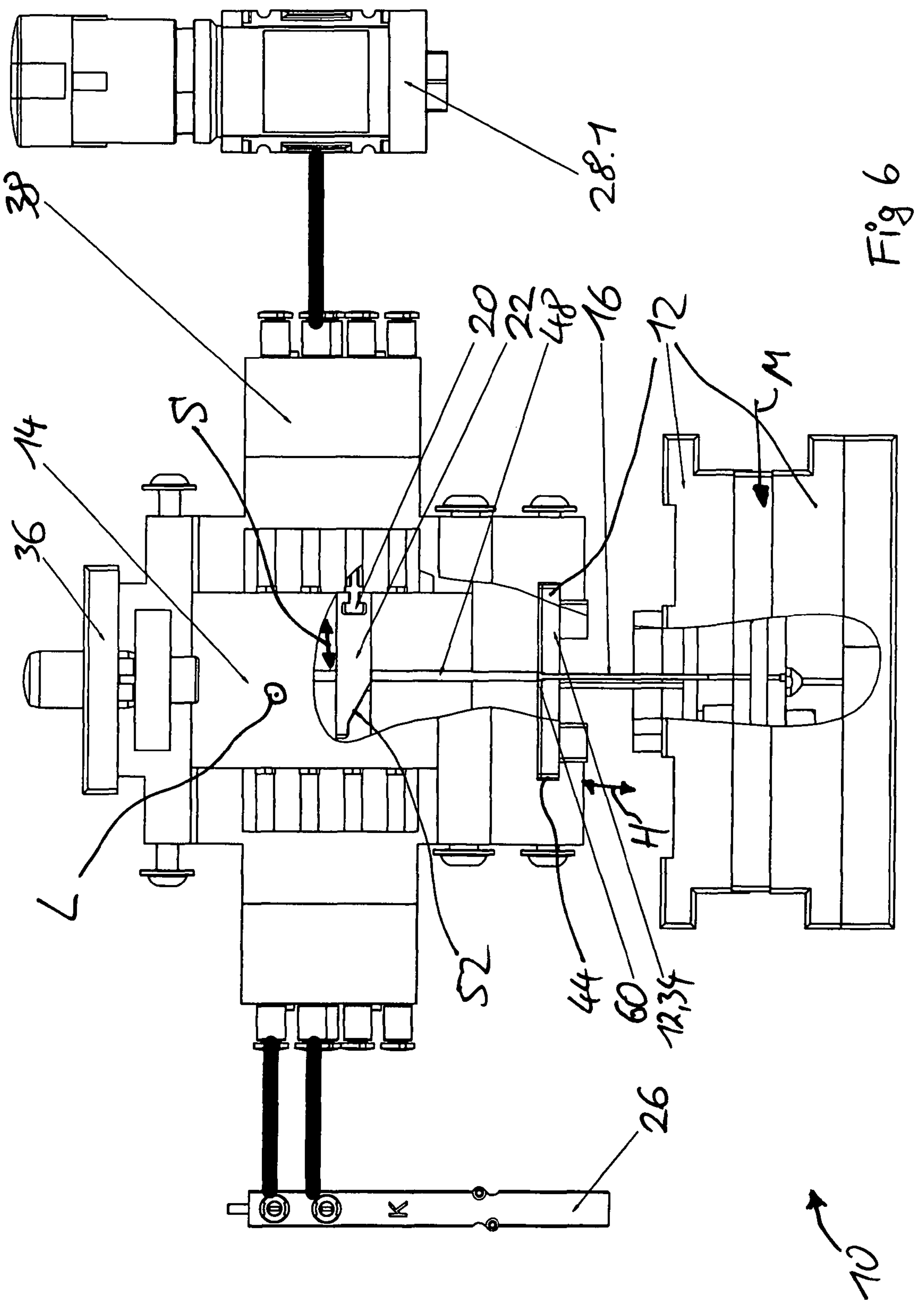
FIG. 6 shows a schematic detailed view according to FIG. 2 with an additional schematic illustration of a valve device and a pressure accumulator.

Finally, FIG. 6 shows the detail according to FIG. 2 with the first pressure accumulator 28.1 and the valve device 26 controlled by the control device 30 additionally shown.

The invention claimed is:

1. A punching/perforating machine (10) for generating a punching/perforating pattern in a material unit/web (M), comprising:

a punching tool (12) having a plurality of punches/perforating needles (16), the punches/perforating needles (16) being arranged in a predetermined grid in a longitudinal direction (L) and movable via a pressure beam (36), the pressure beam (36) being operatively connected via a control device (30) to a drive unit (18) for generating a punching/perforating stroke (H) transversely to the longitudinal direction (L);

a control block (14) for actuating/activating/deactivating the punches/perforating needles (16) by the control device (30) during a punching/perforating process, the control block (14) having piston-cylinder units, movements of the piston-cylinder units during the punching/perforation stroke being controlled individually via the control device (30) and one of the piston-cylinder units being assigned to each punch/each perforating needle (16);

a memory device (40), in which data for a geometry of the punching/perforating pattern is stored, the memory device (40) being connected to the control device (30) by a communication link; and a blocking slide (22), which is respectively connected to a corresponding piston rod (20) of a corresponding piston-cylinder unit, wherein the blocking slide (22) can be displaced into an activation position or a deactivation position by movement of the corresponding piston rod (20), wherein, in the activation position, the blocking slide acts directly or indirectly on a corresponding punch/perforating needle (16) during execution of the punching/perforating stroke (H), and wherein, in the deactivation position, the blocking slide does not exert any action on the corresponding punch/perforating needle (16), whereby, in the activation position of the blocking slide (22), the blocking slide (22) acts on the corresponding punch/perforating needle (16) during the punching/perforating stroke (H) and a perforation is carried out and, in the deactivation position of the blocking slide, no punching/perforation of the material unit/web (M) is effected, wherein the punching tool (12) and/or the control block (14) is/are each designed as a separate subassembly which is each arranged within the punching/perforating machine (10) so as to be removably fixable separately as a unit, wherein the control block (14) has guide recesses arranged in a grid which can be predefined in the longitudinal direction (L) and which corresponds to the grid of the punches/perforating needles (16), wherein extension profiles (48) are longitudinally displaceably mounted in the guide recesses in a stroke direction (H), wherein a length of the extension profiles (48) corresponds to a distance between an underside of the blocking slide and a head of the corresponding punch/perforating needle (16).

2. The punching/perforating machine as claimed in claim 1, wherein the punching tool (12) and/or the control block (14) is/are arranged such that they can be pulled in/out in the longitudinal direction (L) in guide grooves (42, 44, 46) present within the punching/perforating machine.

3. The punching/perforating machine as claimed in claim 2, wherein the guide grooves (42, 44, 46) are formed in such a way that additional adapter units can be introduced in order to permit a form-fitting mounting of different geometries of punching tools (12) or control blocks (14).

4. The punching/perforating machine as claimed in claim 1, wherein each piston-cylinder unit is formed as a double-acting piston-cylinder unit having a first pressure chamber (28) and a second pressure chamber (32), wherein a first pressure (P1) is applied permanently to the first pressure chamber (28) via the control device (30) and causes the blocking slide (22) to be located or held in the deactivation position and, when carrying out punching or perforation, the control device (30) applies a second pressure (P2), which is higher than the first pressure (P1), to the second pressure chamber (32) when activated, such that the blocking slide (22) moves out into the activation position and, as a result, during the punching/perforating stroke (H), this movement is transmitted to the corresponding punch/perforating needle, such that punching or perforation of the material unit/web (M) is carried out.

5. The punching/perforating machine as claimed in claim 4, wherein the blocking slide (22) is in each case connected to the corresponding piston rod (20) of the corresponding piston-cylinder unit in a form-fitting manner with axial and radial play.

6. The punching/perforating machine as claimed in claim 1, wherein the control block has housings (38) which can be controlled individually by the control device (30), and which include the piston-cylinder units arranged offset in the longitudinal direction (L) and in the stroke direction (H).

7. The punching/perforating machine as claimed in claim 6, wherein the piston-cylinder units arranged within the housings (38) correspond in the longitudinal direction (L) to an offset dimension of 0.5 times, 1 times and 2 times a grid size (R) of the punches/perforating needles within the punching tool (12).

8. The punching/perforating machine as claimed in claim 6, further comprising a valve device (26) which is activated by the control device (30) and has a communication link with the piston-cylinder units of the control block (14).

9. The punching/perforating machine as claimed in claim 8, wherein the valve device (26) is formed as a pneumatic or hydraulic system.

10. The punching/perforating machine as claimed in claim 8, wherein the valve device is formed as separately connectable to the punching/perforating machine.

11. The punching/perforating machine as claimed in claim 6, wherein the housings (38) having a plurality of piston-cylinder units are designed to be autonomous with regard to control, pressure regulation and pressure monitoring.

12. The punching/perforating machine as claimed in claim 6, wherein each of the housings (38) has four cylinder-piston units and the control block (14) or the punching tool (12) has four grid recesses arranged to be offset in form of a grid in the longitudinal direction (L) and in a transverse direction for the extension profiles (48) or the punches/perforating needles (16).

13. The punching/perforating machine as claimed in claim 1, wherein a spacer plate (60) is arranged on top of a needle holder (34) of the punching tool (12), wherein the spacer plate (60) either has congruent recesses in a grid size corresponding to a grid size of the punch/perforating needles (16) or is formed as a closed metal sheet.

14. The punching/perforating machine as claimed in claim 13, wherein the spacer plate (60) is fixed to an upper side of the needle holder (34).

15. The punching/perforating machine as claimed in claim 1, wherein the blocking slide (22) has in its free end region a contour (52) inclined relative to the stroke direction (H) in such a way that when the blocking slide (22) is extended, a possibly projecting extension profile (48) or projecting punch/perforating needle (16) is pushed downward in the stroke direction (H).

16. The punching/perforating machine as claimed in claim 1, further comprising a projection laser unit which, depending on data stored in the memory device relating to a contour of the material unit/web (M) to be processed or perforated, depicts these contours on a feed table of the machine, whereby exact alignment of the material unit/web (M) is made possible and position data then acquired by the projection laser unit is fed to the control device (30).

17. The punching/perforating machine as claimed in claim 1, wherein each of the extension profiles (48) has a step-like external circumferential contour, and an associated one of the guide recesses has a corresponding mating contour.

* * * * *